US009159219B2

(12) United States Patent
Magner et al.

(10) Patent No.: US 9,159,219 B2
(45) Date of Patent: Oct. 13, 2015

(54) CONTROL SYSTEM FOR POWER-ASSISTED DOOR

(75) Inventors: David S. Magner, Decorah, IA (US); John Todd Bergman, River Falls, WI (US)

(73) Assignee: Trimark Corporation, New Hampton, IA (US)

(*) Notice: Subject to any disclaimer, the term of this patent is extended or adjusted under 35 U.S.C. 154(b) by 609 days.

(21) Appl. No.: 12/713,029

(22) Filed: Feb. 25, 2010

(65) Prior Publication Data
US 2011/0203181 A1 Aug. 25, 2011

(51) Int. Cl.
| H02P 1/00 | (2006.01) |
| G08C 17/00 | (2006.01) |
| H02J 7/14 | (2006.01) |
| H02J 7/00 | (2006.01) |
| E05F 15/42 | (2015.01) |
| E05F 15/50 | (2015.01) |
| E05F 15/603 | (2015.01) |

(52) U.S. Cl.
CPC ............... *G08C 17/00* (2013.01); *E05B 83/01* (2013.01); *H02J 7/1423* (2013.01); *E05F 15/42* (2015.01); *E05F 15/50* (2015.01); *E05F 15/603* (2015.01); *E05Y 2400/512* (2013.01); *E05Y 2400/612* (2013.01); *E05Y 2900/504* (2013.01); *G08C 2201/51* (2013.01); *H02J 7/00* (2013.01)

(58) Field of Classification Search
USPC .............. 318/139, 445, 446; 320/137; 49/324
See application file for complete search history.

(56) References Cited

U.S. PATENT DOCUMENTS

| 3,666,308 | A | * | 5/1972 | Bonnaud ................ 292/336.3 |
| 4,237,629 | A | | 12/1980 | Schmidt |
| 4,275,611 | A | | 6/1981 | Asher |
| 4,306,208 | A | | 12/1981 | Coors |
| 4,917,412 | A | * | 4/1990 | Swan et al. ................ 292/48 |
| 5,087,799 | A | | 2/1992 | Pariot et al. |
| 5,140,320 | A | | 8/1992 | Gerbier et al. |
| 5,982,126 | A | * | 11/1999 | Hellinga et al. ............. 318/468 |
| 6,065,185 | A | | 5/2000 | Breed et al. |
| 6,175,202 | B1 | * | 1/2001 | Weyerstall et al. .......... 318/280 |
| 6,216,393 | B1 | * | 4/2001 | Apprich ..................... 49/212 |
| 6,321,488 | B1 | * | 11/2001 | Bigoszewski et al. ......... 49/358 |
| 6,349,448 | B1 | | 2/2002 | Breed et al. |
| 6,681,444 | B2 | | 1/2004 | Breed et al. |
| 6,825,628 | B2 | * | 11/2004 | Heigl et al. .................. 318/468 |

(Continued)

FOREIGN PATENT DOCUMENTS

FR 1 444 271 7/1976

*Primary Examiner* — Kawing Chan
(74) *Attorney, Agent, or Firm* — McKee, Voorhees & Sease, PLC (57) ABSTRACT

A control system for a power assisted door, the electronic door control system includes an intelligent control, a plurality of sensor inputs operatively connected to the intelligent control, the plurality of sensor inputs associated with state of a plurality of mechanical components of the power assisted door, and a power drive operatively connected to the intelligent control for providing opening and closing of the power assisted door. The intelligent control is configured to monitor status of the plurality of sensor inputs and control the power drive at least partially based on the status of the plurality of sensor inputs. The intelligent control may be adapted to determine when state of the plurality of sensor inputs is indicative of one or more conditions which would preclude safe door movement. A power distribution module may also be present to assist in limiting current draw and to allow for charging.

17 Claims, 6 Drawing Sheets

(56) References Cited

U.S. PATENT DOCUMENTS

| | | |
|---|---|---|
| 6,896,563 B1 | 5/2005 | Dickson |
| 6,928,694 B2 | 8/2005 | Breed et al. |
| 6,998,977 B2 * | 2/2006 | Gregori et al. .............. 340/505 |
| 7,234,756 B2 * | 6/2007 | Lynam et al. ............. 296/146.5 |
| 7,438,346 B1 | 10/2008 | Breed |
| 8,132,844 B2 * | 3/2012 | Sonnek et al. ............ 296/146.4 |
| 2005/0035669 A1 * | 2/2005 | Bares et al. .................. 307/326 |
| 2005/0276352 A1 * | 12/2005 | Pacsai ........................ 375/316 |
| 2006/0022630 A1 * | 2/2006 | Spurr et al. .................. 318/650 |
| 2006/0091858 A1 * | 5/2006 | Johnson et al. .............. 320/128 |
| 2006/0168891 A1 * | 8/2006 | Aoyama et al. ................ 49/360 |
| 2008/0192659 A1 * | 8/2008 | Santavicca .................. 370/280 |
| 2009/0120002 A1 | 5/2009 | Domholt |
| 2010/0050524 A1 * | 3/2010 | Helms .............................. 49/26 |
| 2010/0107500 A1 * | 5/2010 | Whinnery ...................... 49/279 |
| 2010/0116572 A1 * | 5/2010 | Schmitt et al. ............ 180/65.51 |
| 2011/0074167 A1 * | 3/2011 | Taufman et al. ................ 292/83 |
| 2011/0144868 A1 * | 6/2011 | Tezak et al. .................... 701/49 |
| 2011/0187156 A1 * | 8/2011 | Granny et al. ................ 296/202 |
| 2011/0204675 A1 * | 8/2011 | Sonnek et al. ............. 296/146.4 |
| 2011/0302842 A1 * | 12/2011 | Sonnek et al. ................. 49/349 |
| 2012/0013135 A1 * | 1/2012 | Moon .......................... 292/165 |
| 2012/0042474 A1 * | 2/2012 | Kachtan ........................ 16/350 |
| 2012/0167476 A1 * | 7/2012 | Weinerman et al. ............ 49/460 |
| 2012/0174489 A1 * | 7/2012 | Sonnek et al. ................. 49/460 |
| 2012/0175893 A1 * | 7/2012 | Sonnek et al. ............... 292/143 |
| 2012/0180391 A1 * | 7/2012 | McKee et al. ................... 49/28 |

* cited by examiner

CONTROL SYSTEM FOR POWER-ASSISTED DOOR

FIELD OF THE INVENTION

The present invention relates to access openings, such as, without limitation, doors hatches, ramps, etc. More specifically, but not exclusively, the present invention relates to an electronic door control module for use in doors which use power assist.

BACKGROUND OF THE INVENTION

To assist in providing background of the present inventions, issues associated with heavy duty armored vehicles are discussed. Although the present invention may be used in such applications, the present invention is not to be limited to this particular application, as it is contemplated that the present invention may be used with other types of vehicles or stationary structures.

Heavy duty armored vehicles, used for example, by the military, must be built to withstand forces far greater than encountered by conventional consumer cars and trucks. The utilization of increasingly powerful explosive devices such as IED's, RPG's, and EFP's by hostile insurgent forces has compelled the defense industry to respond by deploying heavier armor on their tactical armored vehicles. While necessary to protect military personnel, heavier armor creates unique problems. The weight of heavily armored vehicle doors and ramps often exceeds 200 lbs., and in some instances, may exceed 1,000 lbs. To open and close such doors or ramps requires assistance from electric, pneumatic, or hydraulic powered units. Such power assisted doors and ramps are known in the industry. Prior art powered doors require separate mechanical and electrical systems, with separate control handles for the door and locks, which result in non-integrated and complicated door functions. These complications necessarily lead to increased difficulties and time in opening and closing the heavy doors of these armored vehicles, particularly in emergency situations.

Yet, attempting to simplify the manner in which a user may use a power-assisted door can significantly complicate its design. What is needed is a control system for a power-assisted door which is flexible and versatile. Furthermore, special design considerations are needed. For example, high power transfer function is needed to provide motion to these substantial doors, yet only limited power is available in the vehicle (especially when the alternator is not charging the system) thus, there is a need to accommodate special design considerations for lower idle current draw as well as redundant backup battery charging.

SUMMARY OF THE INVENTION

It is a primary object, feature, or advantage of the present invention to improve over the state of the art.

It is a further object, feature, or advantage of the present invention to provide a control system for a power-assisted door which is flexible and versatile.

It is a still further object, feature, or advantage of the present invention to provide a control system for a power-assisted door which is capable of use in a military vehicle.

Yet a still further object, feature, or advantage of the present invention is to provide a control system for a power-assisted door which allows for intuitive motion control system for heavy, power assisted, vehicle doors and ramps.

A still further object, feature, or advantage of the present invention to provide a control system for a power-assisted door which simplifies a soldier's ingress and egress from heavily armored vehicles that require power assisted opening and closing of doors.

Another object, feature, or advantage of the present invention is to provide a control system which may be used with a vehicle door having an intuitive joystick control system for locking, unlocking, latching, unlatching, opening and closing the door or ramp.

Yet another object, feature, or advantage of the present invention is to provide a method of controlling a power-assisted door.

A still further object, feature, or advantage of the present invention is to provide a control system for a power-assisted door which assists in maintaining safety.

Yet another object, feature, or advantage of the present invention is to provide a control system for a power-assisted door with a redundant power system.

A still further object, feature, or advantage of the present invention is to provide a control system for a power-assisted door which limits current draw.

Yet a further object, feature, or advantage of the present invention is to provide a control system for a power-assisted door with battery charging capabilities to assist in better managing power.

One or more of these and/or other objectives will become apparent from the following description of the invention. No single embodiment need exhibit each and every object, feature, or advantage.

According to one aspect of the present invention, a control system for a power assisted door, the electronic door control system includes an intelligent control, a plurality of switch/sensor inputs operatively connected to the intelligent control, the plurality of sensor inputs associated with state of a plurality of mechanical components of the power assisted door, and a single or multi-axis power drive controller, such as a servomotor drive or hydraulic controller operatively connected to the intelligent control for providing opening and closing of the power assisted door. The power drive controller may be a servo motor drive or may be an energy transfer device or power drive where power in various forms (electric, pneumatic, or hydraulic) is transferred to door opening/closing motion. The power drive controller may be a single axis device to control only a singular motion, such as the door opening and closing actions, but may also include additional axis/axes for other independent door motions, such as door unlatching, locking or unlocking of primary or secondary mechanisms. The intelligent control is configured to monitor status of the plurality of sensor inputs and control a power drive at least partially based on the status of the plurality of sensor inputs.

The control system may further include a power distribution module operatively connected to the intelligent control and the power drive. The power distribution may be connected to both a vehicle battery and a backup battery and the power distribution may be configured for charging the back up battery or other secondary power systems. The secondary power systems may be located within the vehicle and need not be in the door. The power distribution module may provide for limiting current draw of one or more batteries operatively connected to the power distribution module. The intelligent control system may be adapted to determine when state of the plurality of sensor inputs is indicative of attempts to both open and close the power assisted door at the same time or other conditions which may preclude safe door movement.

According to another aspect of the present invention, a method of controlling a power assisted door is disclosed. The method includes providing electronic door control system including (a) an intelligent control, (b) a plurality of sensor inputs operatively connected to the intelligent control, the plurality of sensor inputs associated with state of a plurality of mechanical components of the power assisted door, (c) a power drive operatively connected to the intelligent control for providing opening and closing of the power assisted door, and (e) wherein the intelligent control is configured to monitor status of the plurality of sensor inputs and control the power drive at least partially based on the status of the plurality of sensor inputs. The method further includes monitoring status of the plurality of sensor inputs at the intelligent control and controlling the power at least partially based on the status of the plurality of sensor inputs.

According to another aspect of the present invention, a control system for a power assisted door is provided. The control system includes an intelligent control and a plurality of sensor inputs operatively connected to the intelligent control, the plurality of sensor inputs associated with state of a plurality of mechanical components of the power assisted door. There is a first actuator operatively connected to the intelligent control for providing opening and closing of the power assisted door and a second actuator operatively connected to the intelligent control for providing locking and unlocking of the power assisted door. The intelligent control is configured to monitor status of the plurality of sensor inputs and control the first actuator and the second actuator at least partially based on the status of the plurality of sensor inputs. The intelligent control may be adapted to determine when state of the plurality of sensor inputs being indicative of one or more conditions which would preclude safe door movement.

DETAILED DESCRIPTION OF THE PREFERRED EMBODIMENTS

The present invention provides an electronic module which may be used to control functions doors requiring power assist. The module complements other mechanical features of said door. The specific features of the door include, without limitation, locking, unlocking, door opening, door closing. Although the term "door" is used here, it is to be understood to broadly refer to structure which provides access to access openings which, in some cases, may be alternatively referred to as ramps or hatches depending upon the specific application. For purposes of explanation, here the door is described with respect to a heavy door or ramp of an armored military vehicle with power assist and an intuitive control system. The present invention is not, however, to be limited to this specific application. In fact, as will later be described herein, the electronic module is very versatile and highly customizable. As such, the electronic module may be used in a variety of different applications including vehicle applications as well as stationary applications. However, use of the electronic module to control a door in an armored military vehicle is one example of a specialized application where particular requirements and functions are highly desirable.

In such an application, there may be the need for automation of armored or other heavy doors that could weigh over 1500 lbf. In such an application control electronics are desired which provide for high energy transfer and also sensitive control for detecting safety related inputs. Parasitic current draw should be minimized to limit battery consumption. Furthermore, provision for redundant battery power source would be desirable. The control electronics should provide for means of monitoring primary and secondary power systems and provide for charging circuitry for the secondary power source. The module should be designed with programmability and hardware configurability in mind. The module should provide for various doors functions, features, and communications protocols, including wired protocols such as, without limitation, controller area network (CAN), Profibus, LIN, RS485 as well as wireless protocols such as, without limitation, bluetooth, WIFI, and ZigBee. Also, special provisions may be desirable due to demands of applications. These demands may include high level of performance in various extreme environmental concerns such as temperature extremes, vibration, shock, and electromagnetic compliance. Lastly, special geometric requirements may make it desirable to provide a special low profile design with consideration for special mounting features.

The electronic module allows for network based control such as using a controller area network (CAN) to control sensor inputs, a power drive, as well as power management and diagnosis system status. The electronic module may also be used to provide for safety interlocks and battery charging. The electronic module may be highly customized through software and programmable. The electronic module may include diagnostics with network (such as CAN) communication.

Figure 1:
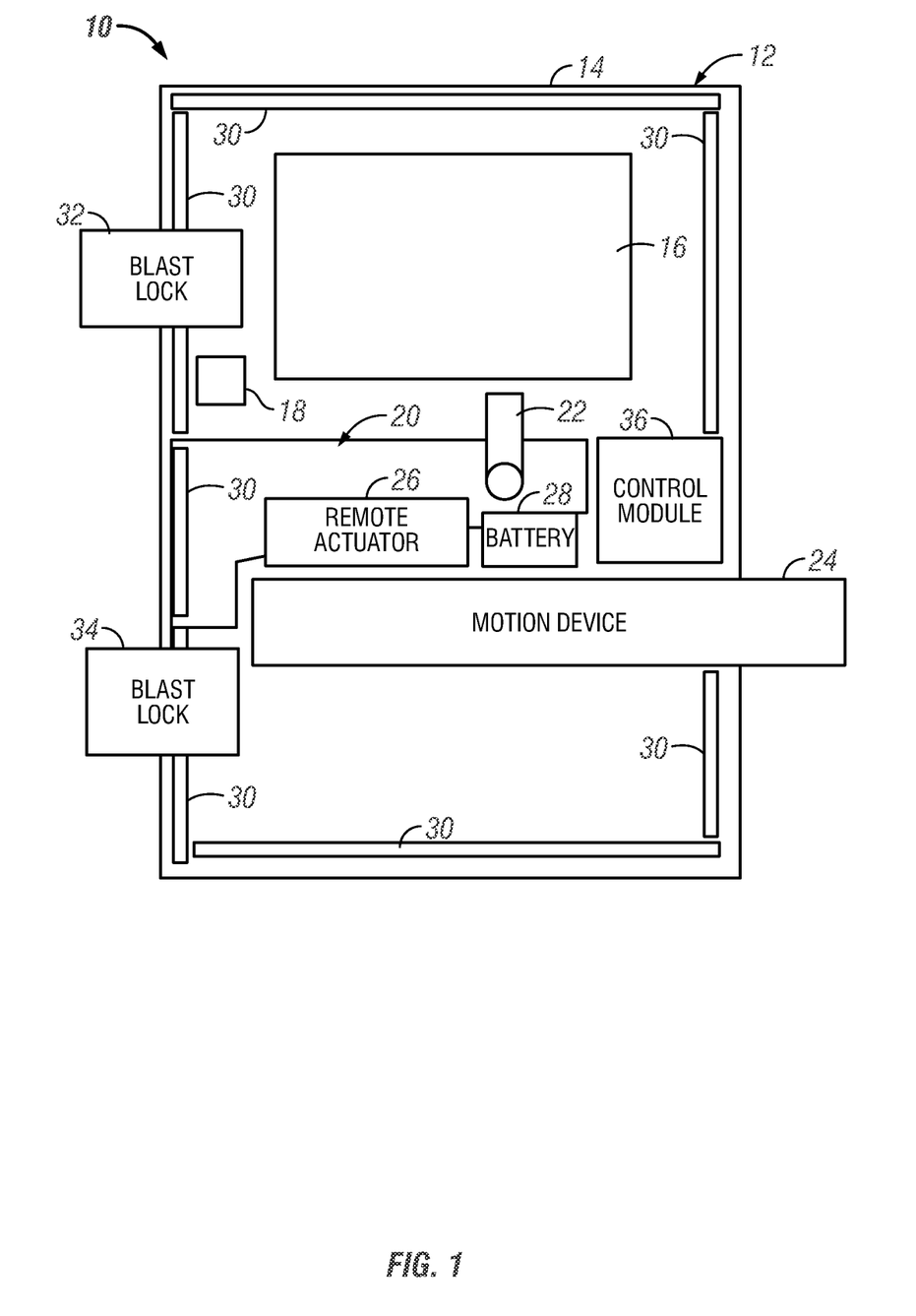
FIG. 1 is a pictorial representation of one embodiment of the present invention in one environment in which it may be used, namely, the door of a military vehicle.

FIG. 1 is a block diagram of one embodiment of a system 10 of the present invention. In system 10, a portion of a vehicle 12 is shown which includes a vehicle ramp or door 14. The door 14 may be associated with an armored military vehicle. The door 14 shown includes a window 16. The door 14 has an exterior handle 18. An intuitive control system module 20 is shown which includes a joystick 22. A motion device 24 such as an actuator or power drive is shown below the intuitive control system module 20. The motion device 24 may be a single axis device to control a singular motion, such as the door opening and closing actions, or may also include additional axis/axes for other independent door motions, such as door unlatching, locking or unlocking of primary or secondary mechanisms. A remote actuator 26 is also shown which may provide additional independent motion from motion device 24. A backup battery 28 which may be a twenty-four (24) volt battery is a redundant source of power beyond primary vehicle power. Safety strips 30 are positioned along outside edges of the door 14. A blast lock 32 with override is also shown as is a blast lock 34. A control module 36 is also shown. The system may also include one or more remote sensors, switches or emergency stop buttons (not shown in FIG. 1).

In the embodiment of FIG. 1, the heavy door 12 can be operated in an intuitive manner. There interior actuating lever that acts as a joystick control 22 in multiple directions to control the mechanical unlatch and also the powered assist. An electric, pneumatic or hydraulic power unit may be used to assist in opening and closing movement. The operators hand must provide force against the joystick control 22 in the direction that the door is intended to move. If the operators hand releases the pressure against the interior lever 22 the door stops movement. Contact bump strips or safety strips 30 are also employed to stop the door 12 closing if resistance is felt such as a leg, arm or combat gear is in the door aperture. Electrical sensors may be incorporated into the mechanism and mechanical cable outputs may be provided. From a functionality standpoint the lever operates as a joystick control 22 in multiple directions to control the mechanical unlatch and also the powered interfaces.

Figure 2:
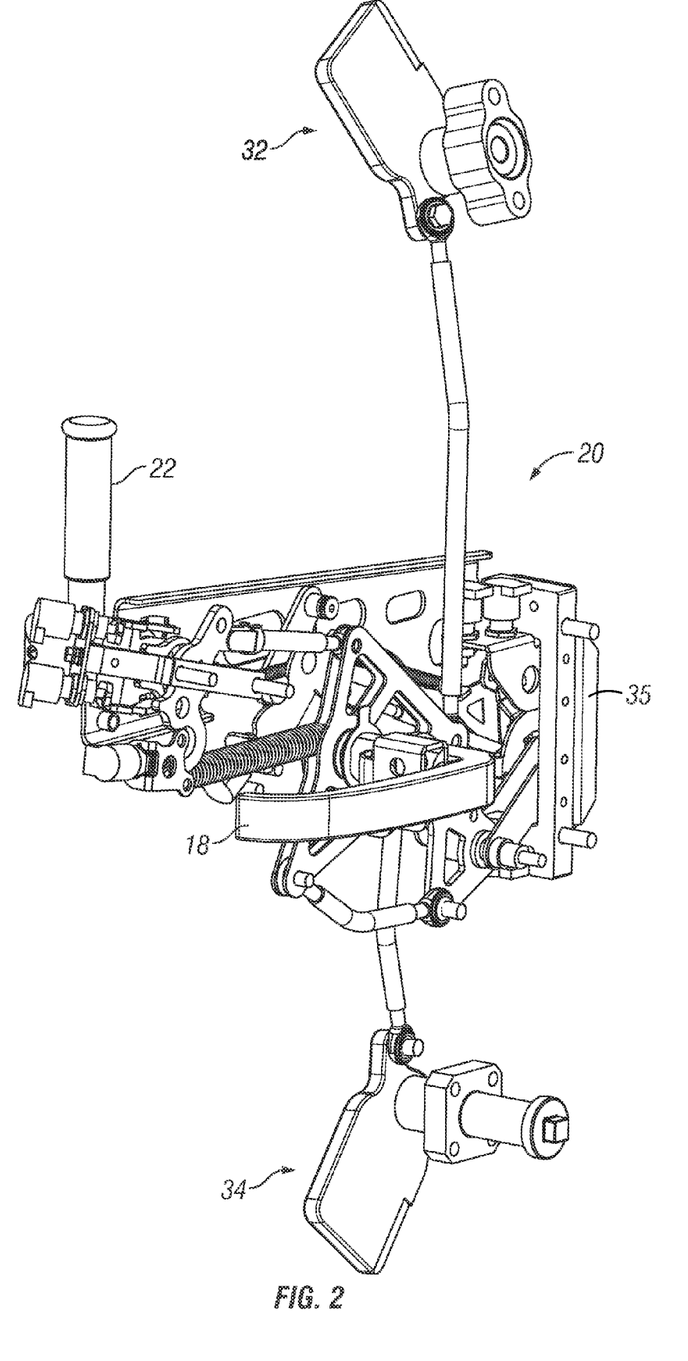
FIG. 2 illustrates mechanical components which may be associated with a power-assisted door.

FIG. 2 illustrates mechanical components associated with the intuitive control system module 20 in greater detail. In FIG. 2, the intuitive control handle module 20 is provided on a door and which is operatively connected to a power assist unit, a latch assembly 35, and the blast lock assemblies 32, 34. The handle module 20 includes an interior joystick assembly 22 and an exterior lever handle 18. A mounting plate supports various linkage components within the door that tie together the joystick assembly 22, the outside handle lever 18, the power assist unit, the latch assembly, and the blast block assemblies 32, 34. Additional detail regarding the mechanical assembly of this particular embodiment is provided in U.S. patent application Ser. No. 12/712,766, entitled "INTUITIVE CONTROL SYSTEM FOR POWER ASSISTED VEHICLE DOORS", and filed contemporaneously herewith which is herein incorporated by reference in its entirety.

The control system allows for a user to operate the door in an intuitive manner. For example, when starting with a closed and latched door and disengaged blast lock 32, 34, the door opening sequence from the exterior of the vehicle is initiated by rotating the 3-position exterior handle 18 down from horizontal neutral position to end of down rotational travel. At the end of down travel, a mechanical trip lever is actuated that unlatches a door latch assembly, and a normally open electrical switch (open Switch-outside handle) is actuated to closed to send a signal to an electrically operated control to initiate the power unit (such as to extend a linear actuator) to open the door. The 3-position exterior handle 18 must be forcibly held in the down position to sustain powered assist opening. As soon as the 3-position exterior handle 18 is released, it will spring return to the horizontal neutral position and the powered assist opening will stop in its present position (this is a safety feature to stop motion if the operator releases the handle 18). If the door has not reached the end of its open travel when the 3-position exterior handle 18 is released, then it may be rotated down to re-activate the powered assist to further open the door to its desired or fully open position.

If the blast locks 32, 34 are engaged (in the closed position), the normally open main switch will be open and will disable the function of 3-position exterior handle 18 to initiate the door opening function. Should an emergency require opening the door from the outside with the blast locks 32, 34 engaged, then a rescue wrench tool (with the same socket detail as on the joystick interior handle, not shown) needs to be placed over the emergency exterior access shaft that connects with the lower blast latch 34. The rescue wrench tool is rotated to mechanically disengage the blast latches 34 (clockwise on left side of vehicle and counter clock-wise on right side of vehicle). At the end of its rotational travel, a door latch assembly trip lever will be actuated along with the normally open electrical switch (open switch-outside handle) to mechanically unlatch the door and initiate the powered assist opening.

To close the door from the inside of the vehicle, the operator pulls inward on the joystick interior handle 22 from its vertical neutral position to the end of its inward travel. This action closes the normally open electrical switch (close switch-inside handle) to send a signal to the electrically operated control to initiate the power unit (such as to retract the linear actuator) to close the door 12. The joystick interior handle 22 must be forcibly held in the inward position to sustain powered assist closing. As soon as the joystick interior handle 22 is released, it will spring return to the vertical neutral position and the powered assist closing will stop in its present position (this is a safety feature to stop motion if operator lets go of handle). If the door has not reached the fully closed position when the joystick interior handle 22 is released, then it may be pulled inward once again to re-activate the powered assist to further close the door to its desired or fully closed and latched position.

If during the powered assist door closing sequence, an object (such as an operator's body or body part) is in the door closing path, normally closed electrical safety contact strips 30 surrounding the interior of the door 12 will be actuated at the impending pinch position and signal the electrically operated control to stop the door closing action immediately and initiate powered assist door opening to relieve and pinch pressure created by the door on the object. Once object pressure is removed from the safety contact strips 30, the door 12 will stop and allow normal manual control functions of the door to continue.

Once the door 12 reaches its closed and latched position, the operator rotates the joystick interior handle 22 forward in the vehicle to mechanically deploy (close) the blast locks 32, 34. With the blast locks 32, 34 deployed, the joystick interior handle 22 will remain in the forward rotated position. In this position, details in the joystick interior handle housing prevent the joystick interior handle 22 to be either pushed or pulled to electrically actuate the powered assist feature.

To open the door from the inside of the vehicle, the operator first disengages the blast locks 32, 34 by rotating the joystick interior handle 22 rearward from the forward position through the vertical neutral position. As the operator continues to rotate the joystick interior handle 22 rearward to the end of its rearward travel, a mechanical trip lever is actuated that unlatches the door latch assembly, and the normally open electrical switch (open switch-inside handle) is actuated to closed to send a signal to the electrically operated control to initiate the power unit (extend the linear actuator) to open the door. This action opens the door past the door latch assembly. At this point, the operator may continue to hold the joystick interior handle 22 rearward to the end of its travel to maintain the powered assist door opening or the joystick interior handle 22 can be pushed outward to maintain the powered assist door opening. The joystick interior handle 22 must be forcibly held in the outward position to sustain powered assist opening. As soon as the joystick interior handle 22 is released, it will spring return to the vertical neutral position and the powered assist opening will stop in its present position (this is a safety feature to stop motion if operator lets go of handle). If the door 12 has not reached the fully open position when the joystick interior handle 22 is released, then it may be pushed outward once again to re-activate the powered assist to further open the door to its desired or fully open position.

It should be appreciated that in the above example, there is a high level of complexity in determining when the door 12 should be opened. The use of the joystick interior handle 22, although intuitive to a user, is a much more complex application than conventional applications where all mechanical latches are simply mechanically unlatched and an actuator provides opening and closing function. The control module 36 of the present invention provides for monitoring switches or other input sensors associated with the door to determine when to activate a power assist (which may include a linear actuator) to open or close the door.

Figure 3A:
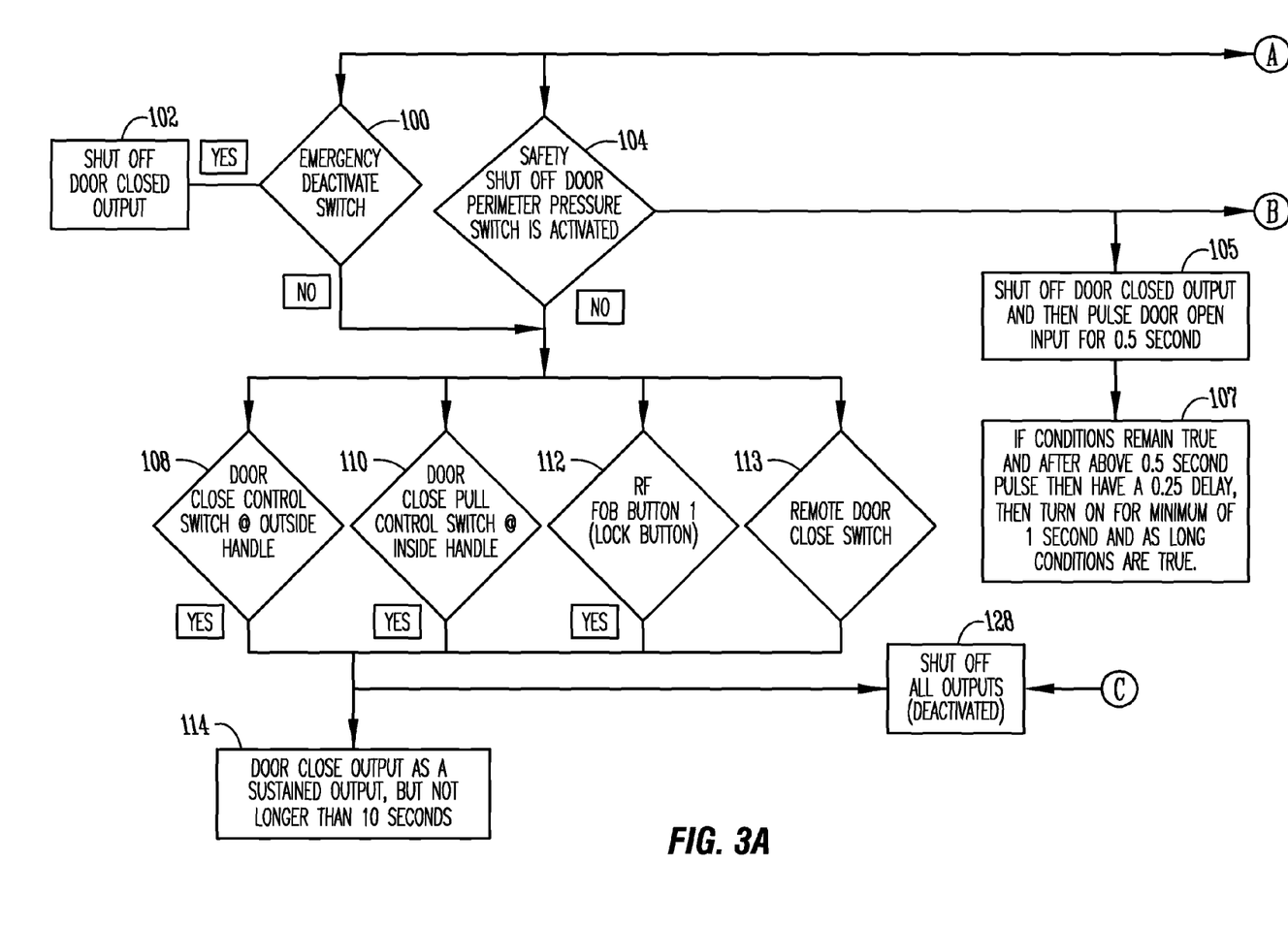
FIGS. 3A-3B is a flow diagram illustrating one example of the logic that may be programmed into the control system of the present invention.
Figure 3B:
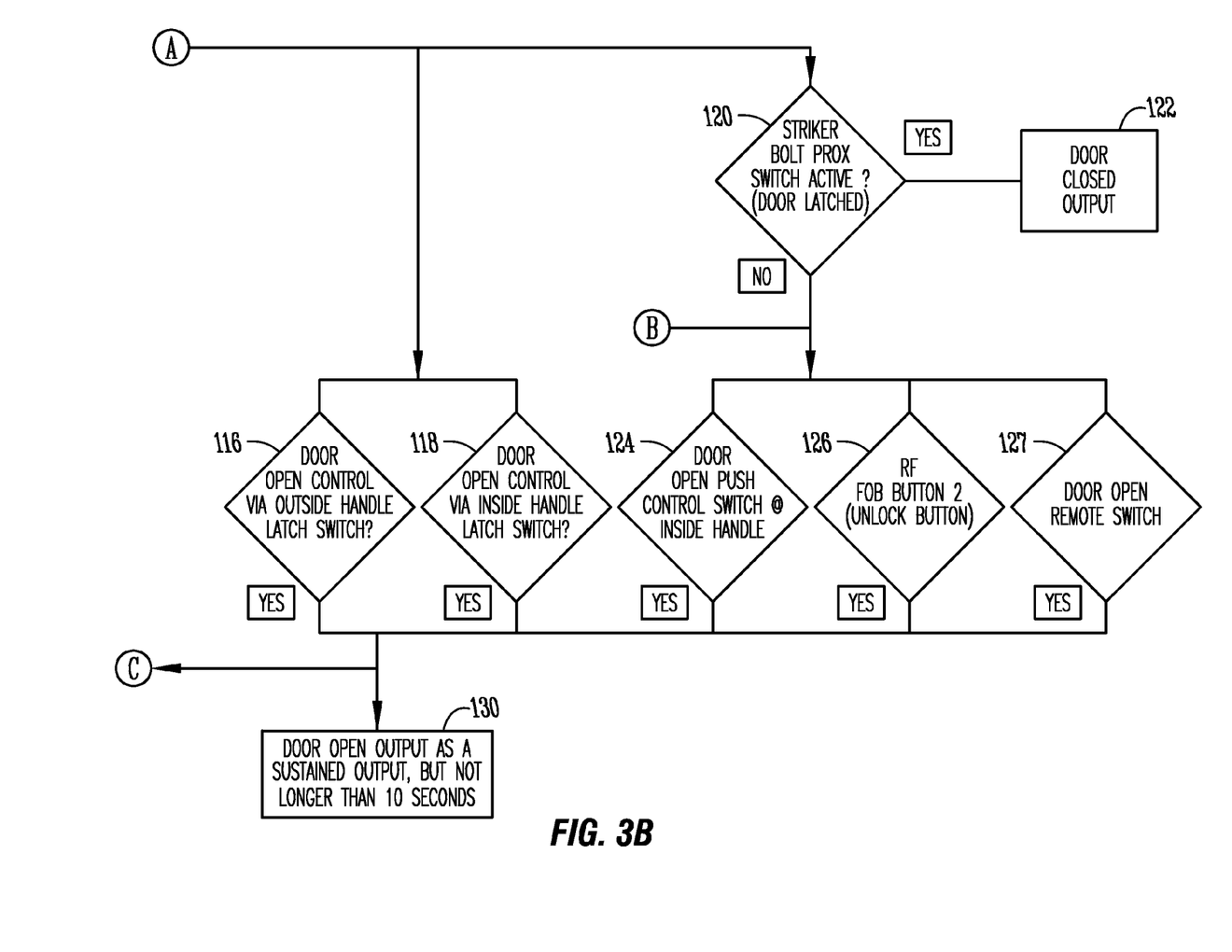

FIGS. 3A-3B illustrates one example of a control module operational logic diagram for the above-described application. The logic is programmed to the control module by receiving simple discrete input signals or via more complex data communications, such as a multiplexing signal. Although individual sensor diagnostic information can be included (handshaking) with data communications, either would satisfactorily provide logic signals needed for illustrated functions of FIGS. 3A-3B. The diagnostics may include setup diagnostics as well as user diagnostics information. The setup diagnostics assist in configuring the system for a particular vehicle and/or motion profile. Parameters may include motion characteristics such as position presets, velocity, acceleration, and deceleration. Additionally setup presets for critical high and low voltage thresholds may be established for proper battery charging.

The user diagnostics are diagnostics for use by a user and may include low battery, sensor status diagnostics, power drive diagnostics, actuator motion errors, timeout functions, safety interrupts, or other types of diagnostics.

Diagnostics may be shown with LEDs, diagnostic codes, or otherwise. In FIGS. 3A-3B, a determination is made in step as to whether or not an emergency deactivate switch is activated. If it is, in step 102, the door closed output is shutoff. In step 104, a determination is made as to whether the safety shut off door perimeter pressure switch is activated. If it is, then in step 105, the door closed output is shutoff and the door open output is pulsed for 0.5 seconds. In step 107, if the conditions remain true after the 0.5 second pulse, then after a 0.25 second delay, the door open output may be turned on for a minimum of 1 second and as long as the conditions are true.

Steps 108, 110, 112, and 113 are shown. In step 108, a determination is made as to whether the door close control switch at the outside handle is activated. In step 110, a determination is made as to whether the door close pull control switch (on the inside of the handle) is activated. In step 112, a determination is made as to whether or not an RF fob lock button is activated. In step 113 a determination is made as to whether the remote door close switch has been activated.

If any of steps 108, 110, 112, and 113 indicate that the corresponding input is activated then someone is trying to close the door. If in step 128, someone is trying to open and close the door at the same time, the door may be shut off until only one input is being triggered. Otherwise, in step 114, a door close output is provided with a sustained output (such as up to, but not longer than 10 seconds).

In step 120, a determination is made as to whether the door is latched (such as whether a striker bolt proximate the switch is active). If it is, then in step 122, a door closed output is activated. If not, then in step 124, a determination is made as to whether the door open push control switch inside the handle is activated. Also in step 126, a determination is made as to whether the RF fob unlock button has been activated. Also, in step 127 a determination is made as to whether or not the door open remote switch is activated.

In step 116, a determination is made as to whether the door open control via the outside handle latch switch is activated and in step 118 a determination is made as to whether the door open control via the inside handle latch switch is activated.

If any of steps 116, 118, 124, 126, and 127 indicate that the corresponding input is activated then someone is trying to open the door. In step 128, all outputs may be shut off, disabled and deactivated if someone is trying to both open and close the door at the same time. If not, then in step 130, the door open output may be provided as a sustained output (such as up to, but not longer than 10 seconds).

Figure 4:
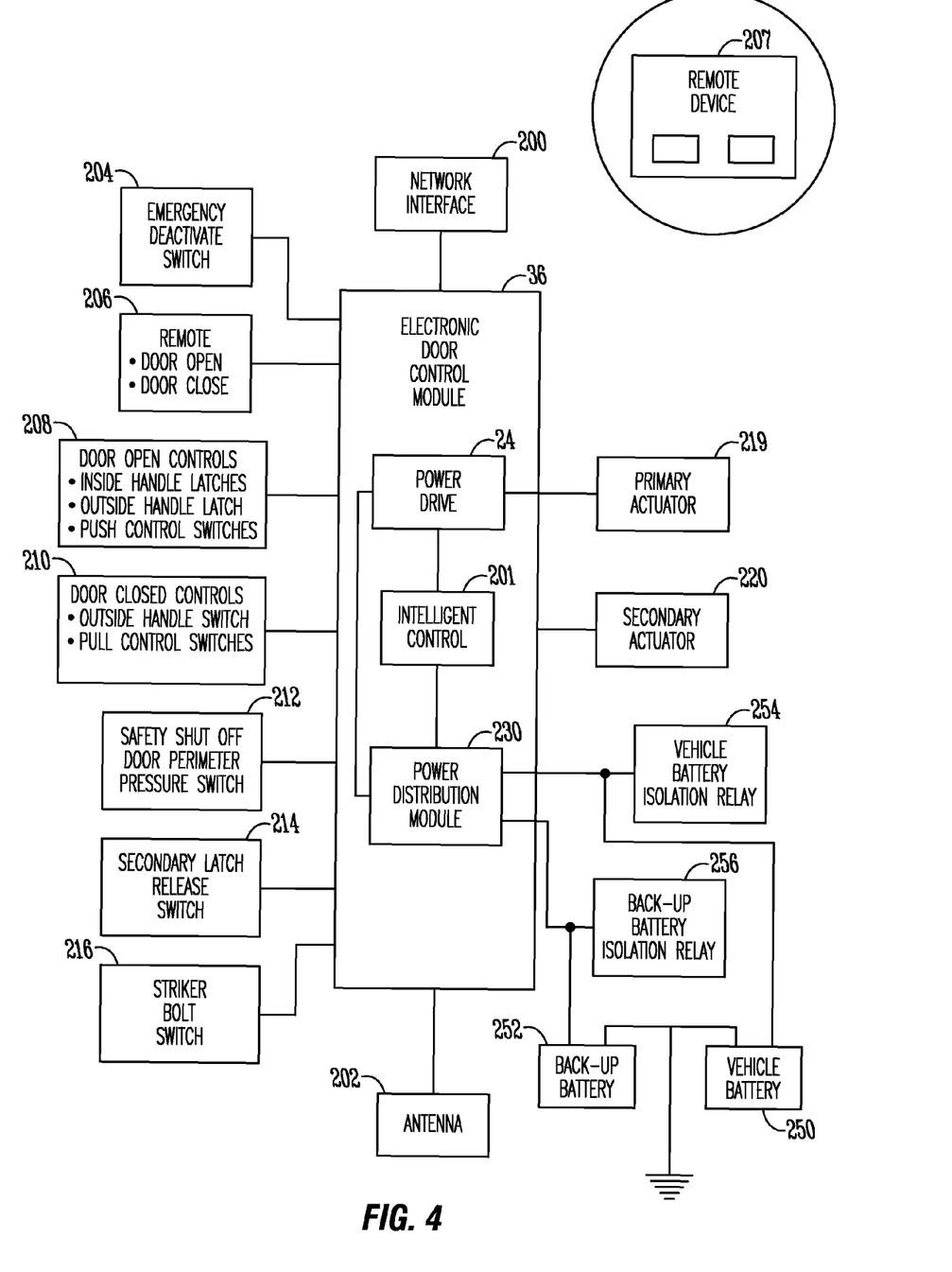
FIG. 4 is a block diagram illustrating a control system for a power-assisted door.

FIG. 4 is a block diagram showing one embodiment of an electronic door control module 36. The electronic door control module 36 may be implemented using a microcontroller or other type of intelligent control 201. The electronic door control module 36 is operatively connected to a network interface 200. The network interface may be wired or wireless and may be of any number of types including, without limitation, CAN, Profibus, LIN, RS485, bluetooth, WIFI, and ZigBee. The network interface allows for control as well as for diagnostics of connected devices. An antenna 202 is also operatively connected to the electronic door control module 36. The antenna 202 may be associated with remote control door operations. A remote device 207 such as an RF FOB may be used to provide for remote opening or closing the door.

The electronic door control module 36 and its intelligent control 201 is operatively connected to various inputs as previously explained. These may include an emergency deactivate switch 204, a wired remote device 206 providing door open and door close inputs. In addition, the electronic door control module may be operatively connected to door open controls 208 and door closed controls 210. Examples of door open controls may include inside hand latch switches or sensors, outside handle latch switches or sensors, and push control switches (such as those associated with a joystick control). Examples of door close controls 210 may include an outside handle switch and pull control switches or sensors (such as those associated with a joystick control).

The electronic door control module 36 may also be operatively connected to a safety shutoff door perimeter pressure switch 212. In addition, the electronic door control module 36 may be operatively connected to a secondary latch released switch 214, and a striker bolt switch 216.

Through the use of the switches or sensors, even a complicated door assembly mechanism such as that shown in FIG. 2 may be monitored using the electronic door control module 36 so that power assist functions may be activated and deactivated in an appropriate manner to provide for power assisted door functionality in a safe and effective manner. As shown in FIG. 4, the electronic door control module 36 may be operatively connected to a power drive 24 which may have an associated power drive controller. The power drive 24 may be implemented using a servo motor. Alternatively, the power drive 24 may be implemented using a brushed DC motor, a brushless DC motor, stepper motors, or other types of power drive components.

The power drive 24 may be activated and deactivated to control opening or closing of the door. A primary actuator 219 and one or more secondary actuators 220 may also be operatively connected to the electronic door control module 36 to provide for door lock/unlock and latch/unlatch functions. The electronic door control module 36 may also include a power distribution module 230. The power distribution module 230, where used, provides for managing power to assist in optimizing power efficiency.

Figure 5:
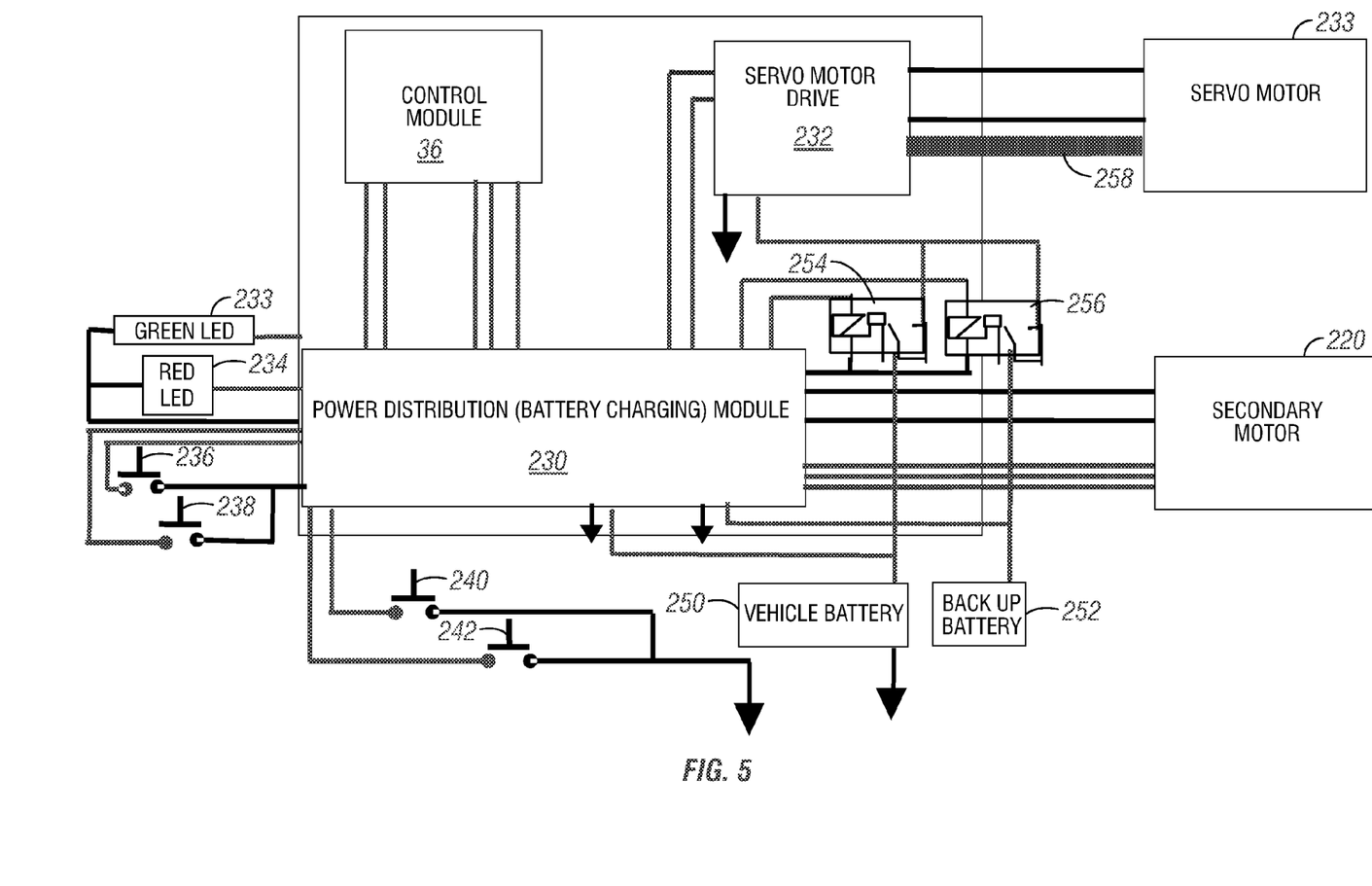
FIG. 5 is a schematic illustrating a power distribution module which may be used in the control system of the present invention.

The electronic door control module 36 provides isolation between the power drive controller 24 via power distribution module 230 external isolation relays 254 and 256. There is an isolation relay both for the vehicle and back up battery power sources. The relays are energized only when the door is active. When door is deactivated demand on battery power is minimized. This is accomplished by having intelligent control module 201 wake up the power drive controller 24 relay via sensor stimuli, such as when operator moves door handle or joystick. When no appropriate stimuli are present, then the power drive controller remains in a non-energized state.

Using the relays to isolate battery sources is advantageous as compared to diodes, which can provide voltage drop, heat and additional cost. With intelligent control of the isolation relays one can operate the door with power on a priority basis, such as with primary vehicle battery if present, back up battery if primary battery is low and both if needed.

The control system uses lower power consumption via optimizing voltages level for various components of the system, e.g. 5 V at intelligent control module microcontroller, 12 V at relays and 24 V at power drive controller. Intelligent control of these power sources can be accomplished from external relays (254 and 256) and as such can deactivate unnecessary modules in idle state.

The use of two isolation relays (254 and 256), one for each battery source, allows for even greater potential energy transfer, if needed for extreme situations, such as very heavy doors or for emergency situations, such as if the vehicle hinge is damaged or if vehicle rolls over in accident so that gravity is perpendicular with hinge pivot axis.

The intelligent control module (201) periodically wakes up to check vehicle power status. If sufficient threshold is measured, alternator is active, then system will remain active without shut down. If power status is reduced beyond minimum threshold, but system sleeps, but then periodically examines status again.

FIG. 5 is a schematic showing additional detail regarding the operation of the power distribution module 230. The power distribution module 230 provides for battery charging and power distribution from alternative sources. The power distribution module 230 is operatively connected to a backup battery 252 and to a high current isolation relay 256. The vehicle battery 250 is also operatively connected to a high current isolation relay 254. Thus, the control module 36 and the servomotor 223 and secondary motor 220 may operate from either the vehicle battery 250 or the backup battery 252. In addition, the backup battery 252 or other secondary power systems may be charged through normal operation of the vehicle. Thus, additional redundancy may be provided. In addition, the vehicle battery 250 may be a 24 volt battery and the power distribution module may provide a different voltage, such as 12 volts to the control module 36 and a different voltage, such as a 5 volt control signal to the servo motor drive, while providing a full 24 volts to the secondary motor 220. The battery charging algorithm may take into account differences in temperature coefficients and other factors to provide for proper charging to maximize battery life.

Preferably there is little parasitic or idle current draw associated with the electrical system of the door. This can be achieved through selection of microcontrollers or other components with low current draws. In addition the control module 36 may be placed in a sleep mode to reduce current draw when the door is not in operation.

As shown in FIG. 5, a servo motor drive 232 is operatively connected to the primary servomotor 233. A resolver feedback cable 258 may also be provided between the servo motor 24 and the servo motor drive 32 to provide feedback from the servo motor 24. LEDs may be used to show status information such as a green LED 233 and a red LED 234 to show state information. A motor extend switch 236 and a motor retract switch 238 may be operatively connected to the power distribution module 230. A door open switch 240 and a door closed switch 242 may also be operatively connected to the power distribution module.

The invention has been shown and described above with the preferred embodiments, and it is understood that many modifications, substitutions, and additions may be made which are within the intended spirit and scope of the invention. For example, although described with respect to doors of an armored military vehicle, the present invention may be used in conjunction with any number of other types of doors whether vehicle doors or doors to other structures. Although described with respect to a particular feature set well-suited to a particular environment, it should be apparent that the electronic control module of the present invention is highly customizable and configurable through software, and that different features may be used in different applications for different environments. These and other variations, options, and alternatives are within the spirit and scope of the invention.

What is claimed is:

1. An electronic control system for a power assisted hinged door mounted to a door frame, the door having interior and exterior door handles for opening and closing a door, a latch for latching and unlatching the door, and a blast lock extendable from the door into the frame to preclude opening of the door, the interior handle is operatively connected to the latch and to the blast lock, the control system comprising:
    an intelligent control operatively connected to the interior and exterior handles, the latch, and the blast lock;
    a plurality of electrical sensor inputs operatively connected to the intelligent control, the plurality of sensor inputs associated with the state of each of the interior handle, the exterior handle, the blast lock, the latch, and the position of the door;
    a power drive operatively connected to the intelligent control for providing opening and closing of the power assisted door;
    wherein the intelligent control is configured to monitor status of the plurality of electrical sensor inputs and control the power drive at least partially based on the plurality of electrical sensor inputs, and to achieve intuitive control of the interior and exterior handles; and
    the intelligent control being operative for actuating the blast lock extension into and retraction from the door frame, for activating the latch, and for pivoting the door open and closed.

2. The control system of claim 1 further comprising a power distribution module operatively connected to the intelligent control and the power drive.

3. The control system of claim 2 wherein the power distribution module is operatively connected to a vehicle battery and a backup battery.

4. The control system of claim 3 wherein the power distribution module is configured for charging the back up battery.

5. The control system of claim 2 wherein the power distribution module provides for limiting current draw of one or more batteries operatively connected to the power distribution module.

6. The control system of claim 1 further comprising a wireless remote device in operative communication with the intelligent control.

7. The control system of claim 1 further comprising a controller area network (CAN) interface.

8. The control system of claim 1 wherein the intelligent control determines when the sensor inputs indicate attempts to both open and close the power assisted door at the same time.

9. The control system of claim 1 wherein the intelligent control determines when the sensor inputs indicate one or more conditions which would preclude safe door movement.

10. The control system of claim 1 wherein the interior handle is a joystick pivotal about two perpendicular axes.

11. The control system of claim 1 wherein the electrical sensors include a first position sensor on the interior handle, a second position sensor on the blast lock, a third position sensor on the latch, and the first, second and third sensors each generating an input signal to the intelligent control corresponding to the positions of the interior handle, blast lock, and latch, respectively.

12. The control system of claim 1 wherein the intelligent control locks the blast lock only after the door is latched, and unlatches the door only after the blast lock is unlocked.

13. The control system of claim 1 further comprising a primary actuator to open and close the door and a secondary actuator to lock and unlock the blast lock.

14. The control system of claim 13 wherein the intelligent control is operatively connected to the primary and secondary actuators.

15. A method of electrically controlling a power assisted hinged door mounted to a door frame and having interior and exterior door handles and motorized actuator for opening and closing the door, a door latch assembly for latching and unlatching the door, and a door blast lock assembly engageable and disengageable with the door frame for locking and unlocking the door via a secondary motorized actuator, the method comprising:

providing an electronic door control system including (a) an intelligent control, (b) a plurality of sensor inputs operatively connected to the intelligent control, the plurality of electrical sensor inputs being associated with positions of each of the interior handle, the exterior handle, the power assisted door, the lock assembly and the latch assembly, and (c) a power drive operatively connected to the intelligent control for providing opening and closing of the power assisted door, and monitoring status of the plurality of electrical sensor inputs at the intelligent control;

controlling the power drive at least partially based on the status of the plurality of sensor inputs, and controlling operation of the latch and lock assemblies using the intelligent control, wherein the intelligent control locks the blast lock only ater the door is latched, and unlatches the door only after the blast lock is unlocked.

16. The method of claim 15 further comprising controlling a secondary actuator at least partially based on the status of one or more of the sensor inputs.

17. The method of claim 15 further comprising managing power associated with the power-assisted door.

* * * * *